(12) United States Patent
Yokoyama

(10) Patent No.: US 6,611,558 B1
(45) Date of Patent: Aug. 26, 2003

(54) METHOD AND APPARATUS FOR CODING MOVING PICTURE

(75) Inventor: Yutaka Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 377 days.

(21) Appl. No.: 09/679,230

(22) Filed: Oct. 4, 2000

(30) Foreign Application Priority Data

Oct. 26, 1999 (JP) ............................................. 11-304385

(51) Int. Cl.[7] ........................... H04N 7/12; H04N 11/02; H04N 11/04
(52) U.S. Cl. .............................. 375/240.15; 375/240.15
(58) Field of Search ..................... 375/240.02, 240.03, 375/240.12, 240.13, 240.15; 348/404.1, 405.1, 419.1; 382/236, 238, 239, 251; H04N 7/12

(56) References Cited

U.S. PATENT DOCUMENTS

| | | | | |
|---|---|---|---|---|
| 5,325,125 A | * | 6/1994 | Naimpally et al. | .... 375/240.12 |
| 5,694,171 A | * | 12/1997 | Katto | ..................... 375/240.03 |
| 5,699,113 A | * | 12/1997 | Ohiwa | ..................... 348/240.3 |
| 5,719,986 A | * | 2/1998 | Kato et al. | ................... 386/109 |
| 5,763,374 A | * | 6/1998 | Sakai et al. | ................. 508/469 |
| 5,815,097 A | * | 9/1998 | Schwartz et al. | ............. 341/51 |
| 5,969,750 A | * | 10/1999 | Hsieh et al. | ................ 348/14.1 |
| 6,480,540 B1 | * | 11/2002 | Guillotel | ................. 375/240.03 |

FOREIGN PATENT DOCUMENTS

| | | |
|---|---|---|
| JP | 7-112284 | 11/1995 |
| JP | 9-261658 | 10/1997 |
| JP | 9-294266 | 11/1997 |
| JP | 10-304374 | 11/1998 |

OTHER PUBLICATIONS

Effros et al, One–Pass Adaptive Universal Vector Quantization, 1994, IEEE, pp. V–625–V–628.*

* cited by examiner

*Primary Examiner*—Nhon Diep
(74) *Attorney, Agent, or Firm*—Scully, Scott, Murphy & Presser (57) ABSTRACT

A moving picture coding apparatus and method with improved predictability of a moving picture to be subjected to interframe prediction to obtain an improved quality of a coded picture. In a moving picture coding apparatus for performing interframe motion compensated prediction for applying intraframe coding, interframe forward predictive coding and interframe bidirectional predictive coding to code each frame, by determining a prediction frame interval of frames to be subjected to forward prediction on the basis of interframe predictability, a moving picture is coded while the coder is adaptively changing the prediction frame interval in accordance with the predictability.

13 Claims, 13 Drawing Sheets

METHOD AND APPARATUS FOR CODING MOVING PICTURE

BACKGROUND OF THE INVENTION

1. Technical field of the Invention

The present invention relates to an apparatus which realizes picture coding, for example, moving picture coding defined by a standard such as ISO/IEC 13818-2 (MPEG-2) and, more particularly, to a high picture quality coding control system.

2. Description of the Prior Art

Hitherto, in the case of performing motion compensated interframe predictive coding defined by a standard such as ISO/IEC 13818-2 (MPEG-2), generally, the three kinds of picture types of an intraframe coded picture (I-picture (I frame)), an interframe forward predictive coded picture (P-picture (P frame)), and an interframe bidirectionally predictive-coded picture (B-picture (B frame)) are arranged in an ordered pattern which is generally fixed.

It is common in the technical field to which the present invention belongs that the distance between the I-pictures (I frames) is expressed by "N" and the distance between the I-picture and the P- picture (P-frame) or between the P-pictures is expressed by "M". Generally, the N and M values are fixed and are controlled so as not to be dynamically changed.

Figure 9A:
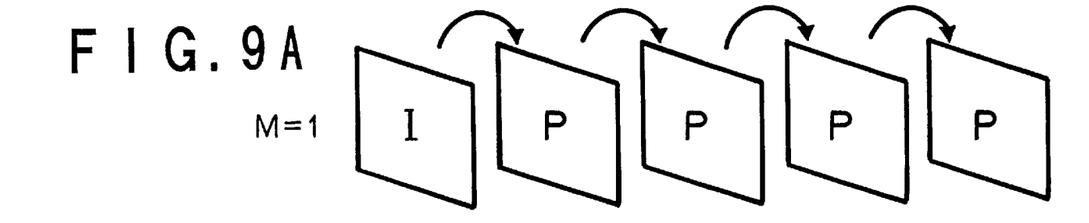
FIG. 9A is a diagram for explaining frame intervals between predictive coded pictures and reference pictures when M is 1.

For example, when the M value is set to 1 as shown in FIG. 9A, the I-picture (I frame) is included as the first picture in a pattern, the P-pictures (P frames) are arranged every (first) picture and no B-picture (B frame) is used. In the case of M=1, a P-picture (P frame) is coded by interframe forward prediction by referring to the immediately preceding picture.

Figure 9B:
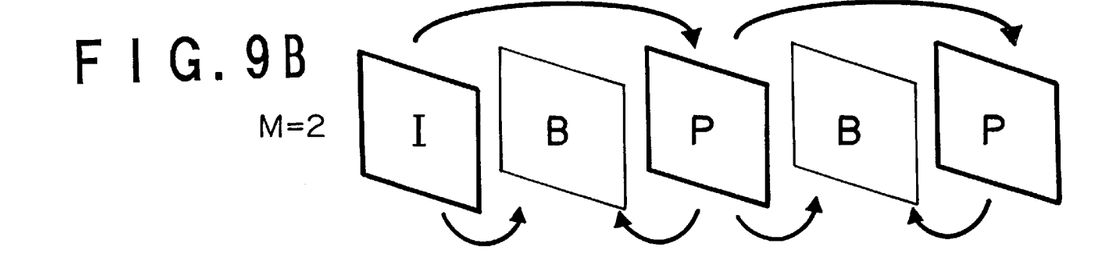
FIG. 9B is a diagram for explaining frame intervals between predictive coded pictures and reference pictures when M is 2.

When the M value is set to 2 as shown in FIG. 9B, the I picture is included as the first picture in a pattern, the P pictures are arranged every second picture and one B picture is arranged between each "I- and P-pictures (P frames)" and "P-and P-pictures (P frames)". In the case of M=2, each of the P pictures is coded by interframe prediction by referring to the two preceding I- or P-picture (P frame). The B-picture is coded by bidirectional interframe prediction by referring to the forward or backward I- or P-picture (P frame). Consequently, the order of coding by using B-pictures is different from the input order of pictures. After reference frames on both sides are coded, a B-picture is coded.

Figure 9C:
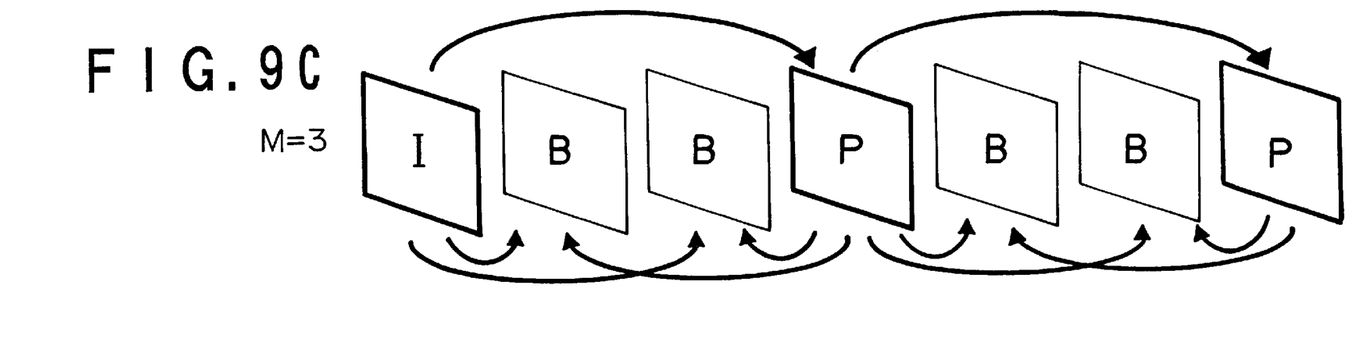
FIG. 9C is a diagram for explaining frame intervals between predictive coded pictures and reference pictures when M is 3.

When the M value is set to 3 as shown in FIG. 9C, the I-picture (I frame) is included as the first picture of a pattern, the P-pictures (P frames) are arranged every third picture, and two B-pictures are arranged between each "I- and P-pictures (P frames)" and "P- and P-pictures (P frames)". In the case of M=3, the P-picture (P frame) is coded by interframe prediction by referring to a three preceding I- or P-picture (P frame). The B-picture is coded by bidirectional interframe prediction by referring to the forward or backward I- or P-picture (P frame) in a manner similar to the case of M=2.

Even when the M value increases, the order is similar to the above. The I-picture (I frame) is used as the first picture of a pattern and P-pictures (P frame) are arranged every Mth order. (M-1) B-pictures are used between each "I- and P-pictures (P frames)" and "P- and P-pictures". A P-picture (P frame) is coded by the interframe prediction by referring to an M-preceding picture.

One of the reasons why the B-picture is used, is in general, to improve the prediction efficiency by the bidirectional predictive coding. When the temporal redundancy is reduced by the interframe prediction, the quantity of codes in the case of using the same quantization step is reduced and, moreover, the picture quality in the case of the same compression ratio (coding rate) is improved.

Another reason of using the B-pictures is to reduce accumulation of errors caused by continuous forward predictive coding. When frames to be subjected to forward predictive coding continue, a predictive picture itself which is referred to is an interframe predictive coded frame. Assuming now that, when the reference picture in the predictive coding is an I-picture (I frame), the generation of a coded picture is 1 and the generation of a picture which is coded by referring to a picture of the generation (n) is (n+1), increase in the number of generations with elapsing of time in the case of only the forward prediction is faster than that in the case of using the bidirectional prediction. As a result, quantization errors caused by coding are accumulated and become conspicuous and it causes deterioration in picture quality. By using the bidirectional prediction, this problem is lessened.

Although the bidirectional prediction has such an advantage, increase in the M value (distance between each "I- and P-pictures" and "P-P pictures") is disadvantageous for the interframe predictive coding. That is, generally, as the interval between the reference frame used for the interframe prediction and a frame to be interframe predictive coded increases, the correlation between the frames is lowered and the interframe predictability deteriorates.

With respect to the interval between frames of the I- or P-pictures indicated by the M value, the optimum point according to an input picture exists. Consequently, in order to improve the picture quality at the same compression ratio (coding bit rate), it is necessary to optimize the M value and perform coding with the optimized M value.

Figure 10:
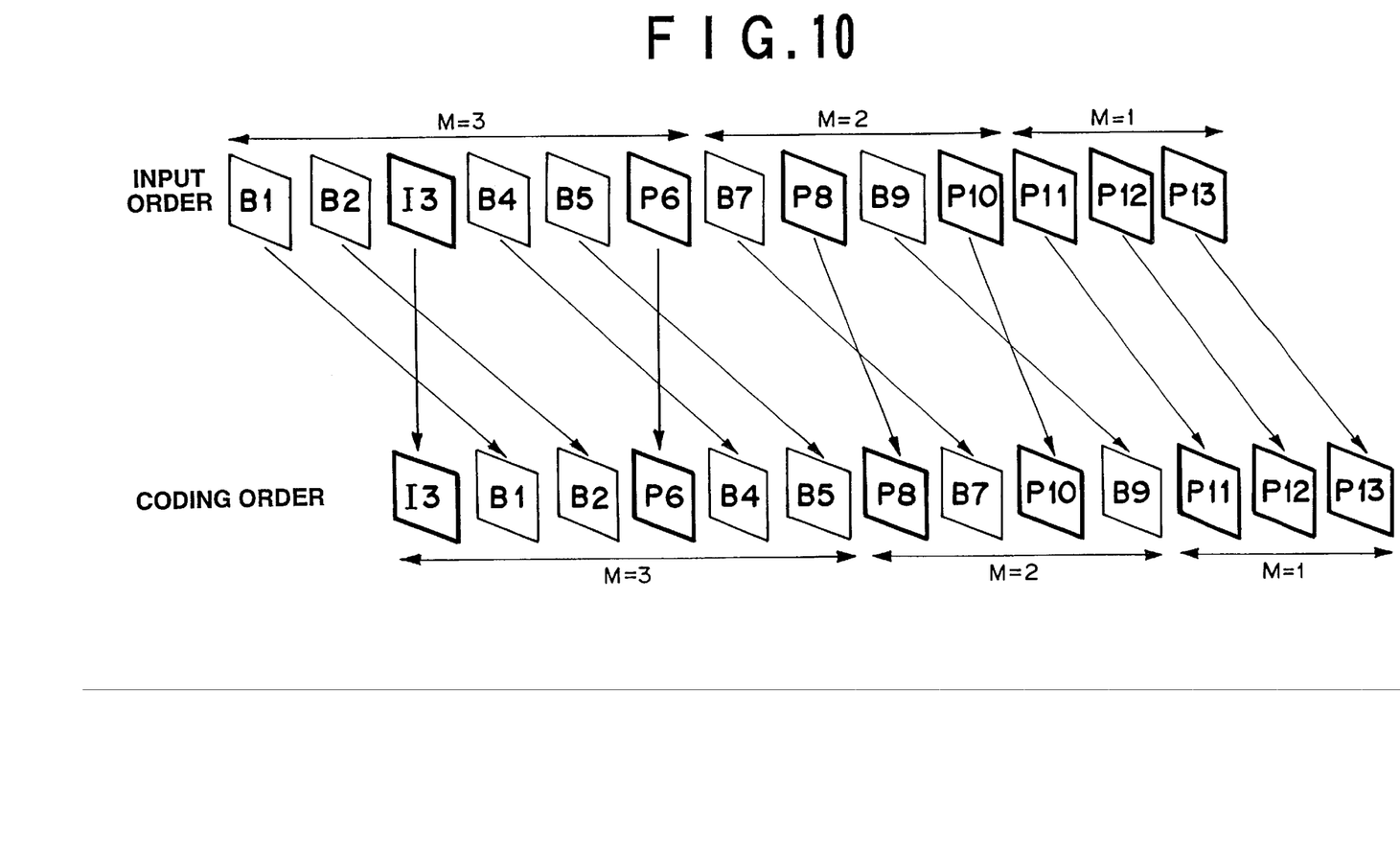
FIG. 10 is a diagram showing the relation between the order of input pictures and the coding order in the moving picture coding apparatus of the invention.

One of methods for solving such problems is a method of coding a picture while it is dynamically changing the M value. FIG. 10 shows an example of the case of decreasing the M value. Reference numerals in the diagram denote picture types and picture numbers in the input order. FIG. 10 shows a case where coding is performed with the M value of 3 in the beginning, and the M value is switched to 2 and then to 1.

Pictures are coded while the coder is changing the M value to the optimum M value. As shown in the diagram, by changing the M value after the I- or P-picture (P frame) is inputted in the input order or before the I- or P-picture (P frame) is coded in the coding order, pictures can be continuously coded.

Figure 11:
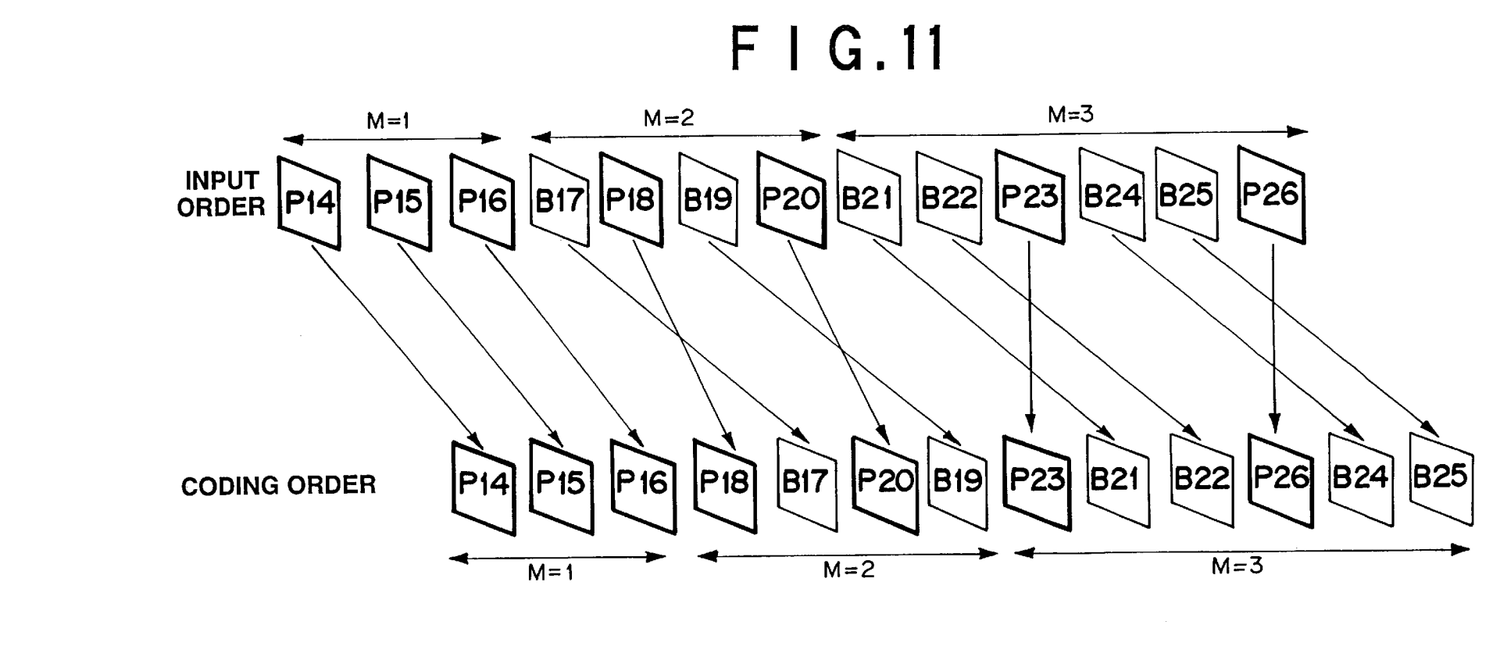
FIG. 11 is a diagram showing the relation between the order of input pictures and the coding order in the moving picture coding apparatus of the invention.

FIG. 11 shows the case of increasing the M value from 1 to 2 and then from 2 to 3. In the case where pictures are coded with a large M value, it is necessary to rearrange the order of coding B-pictures. Consequently, there is a frame delay between input of a picture signal and coding. Even if coding is started with a small M value, therefore, it is necessary to start the coding with a frame delay large enough to allow a delay which occurs in the case where coding is performed with the maximum M value which can be dealt by the coding apparatus.

Figure 12:
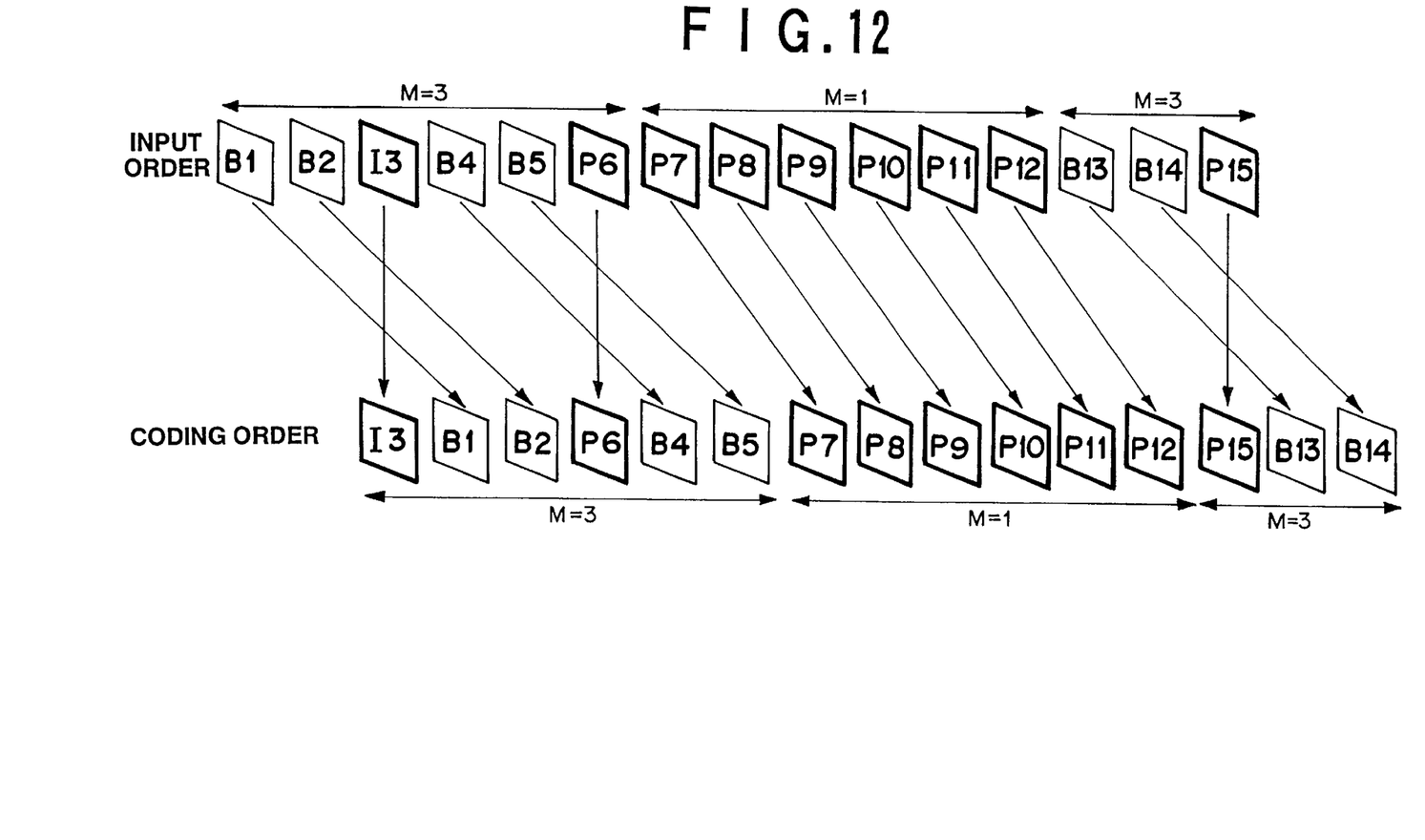
FIG. 12 is a diagram showing the relation between the order of input pictures and the coding order in the moving picture coding apparatus of the invention.

Further, FIG. 12 shows an example of the case where the M value is not continuously changed but is changed from 3 to 1 or from 1 to 3. As shown in the drawing, the M value can be also changed to a value which is not continuous.

One of conventional methods of coding pictures while dynamically changing the M value is disclosed in JP9-294266 A (1997) (hereinbelow, called "first related art").

This publication discloses an example of a system of changing a distance between frames of intraframe prediction on the basis of a motion vector search range. According to the technique disclosed in the publication, the distance between frames is increased according to the ratio of distribution of motion vectors and the distance between frames is shortened according to a differential value between frames.

Figure 13:
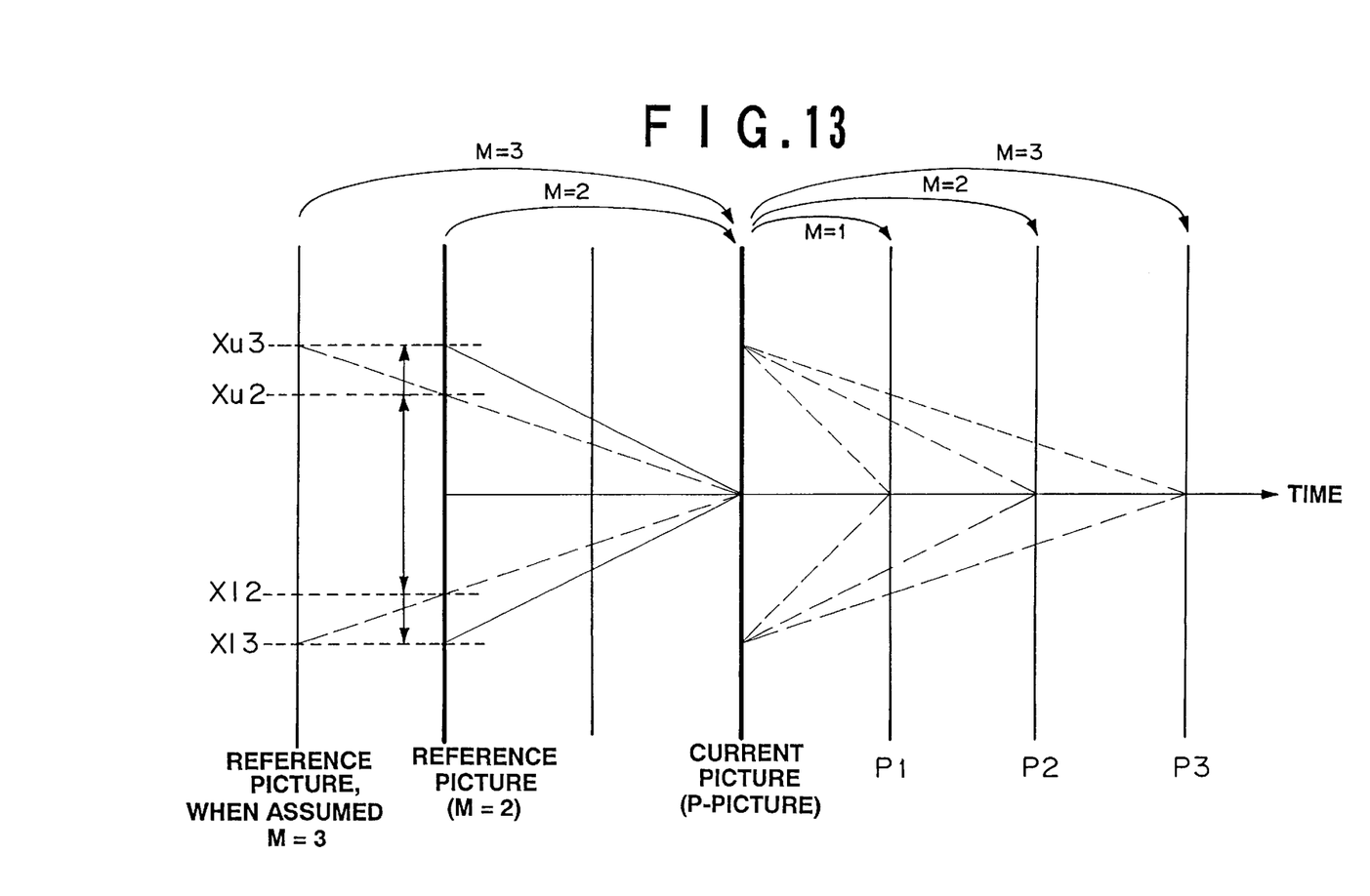
FIG. 13 is a diagram for explaining the operation of a conventional moving picture coding apparatus.

For example, as shown in FIG. 13, a case of using a motion vector search range from X13 to Xu3 and coding a current picture with the M value of 2 will be examined. At this time, in the case where a number of motion vectors detected are distributed within the range from X12 to Xu2, which is ⅔ of the search range, it is regarded that the motion vectors can be sufficiently searched in the same search range even when the M value is changed to 3. Consequently, the M value is increased to 3 and a next picture to be coded as a P-picture (P frame) is set as P3. Alternatively, the M value is unchanged and a next picture to be coded as a P-picture (P frame) is set as P2. When the difference between frames exceeds a predetermined value, the M value is contrarily decreased to 1 and a next picture to be coded as a P-picture (P frame) is set as P1.

Another conventional technique is disclosed in JP 10-304374 A (1998) in which the M value is dynamically changed during coding (hereinbelow, called "second related art"). The publication discloses an example of a system of increasing/decreasing the distance between frames for interframe prediction in accordance with the value of prediction efficiency. The prediction efficiency is calculated by using the value of a prediction error and the value of activity.

A disadvantage of the first related art is that the M value cannot be always optimized merely by using the distribution of detected motion vectors since the predictability does not simply depend on only the size of the search range, but there is a case such that a smaller M value is preferable even when motion vectors are within the search range. Another disadvantage is that the M value cannot be optimized only by the value of the difference between frames since the predictability does not simply depend on only the value of the difference between frames but there is a case that the M value may be increased when prediction can be made with a larger M value.

A disadvantage of the second related art is that the M value may not be optimized, even when the value of the prediction error and the value of activity are used. The degree of the percieved prediction error is not considered, since the efficiency of prediction is set as a reference for changing the M value in the art. The degree of deterioration in picture should be measured with respect to a picture obtained as a result of coding an interframe prediction error. The influence of the quantization is not considered in the art, because the activity is measured for the input picture.

SUMMARY OF THE INVENTION

It is therefore an object of the invention to optimize the M value by taking a degree of a perceived prediction error into consideration.

The invention is characterized in that, in the case of coding moving pictures to be subjected to interframe motion compensated prediction adapted to intraframe coding, interframe forward predictive coding and interframe bidirectional predictive coding, by calculating predictability of interframe prediction and determining a prediction frame interval of frames to be subjected to forward prediction in accordance with the interframe predictability, moving picture are coded while adaptively changing the prediction frame interval in accordance with the predictability.

According to the present invention, the M value can be properly switched and the quality of a coded picture can be improved since the degree at which deterioration in picture quality by coding is detected is used as a reference.

PREFERRED EMBODIMENT OF THE INVENTION

Figure 1:
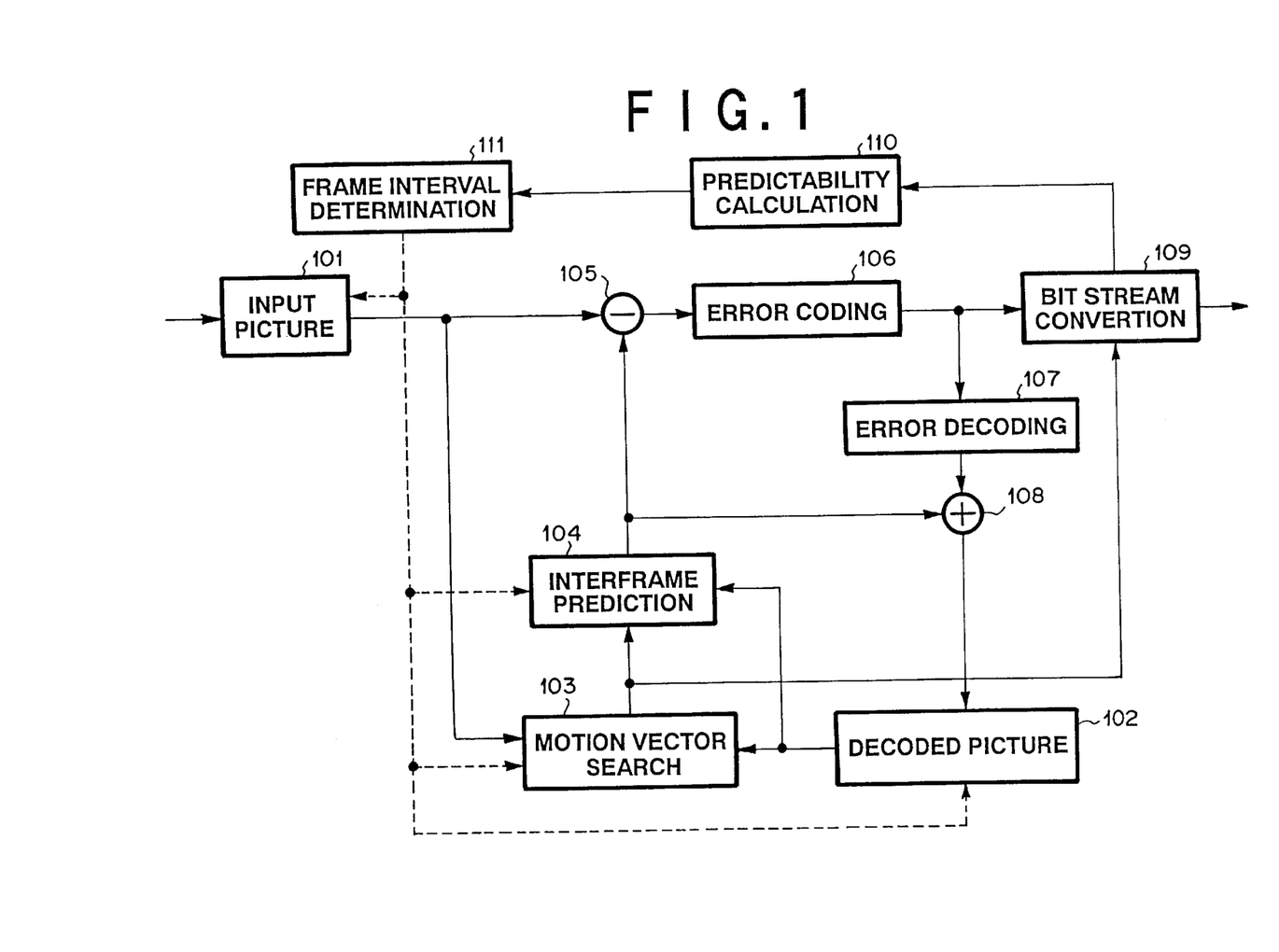
FIG. 1 is a block diagram showing an embodiment of a moving picture coding apparatus of the invention.

FIG. 1 is a diagram showing the first embodiment of the invention. In FIG. 1, a moving picture coding apparatus of the invention comprises an input picture storage unit 101, a local-decoded picture storage unit 102, a motion vector searching unit 103, a motion compensation interframe predicting unit 104, a subtractor 105, a prediction error coding unit 106, a prediction error decoding unit 107, an adder 108, a bit stream converting unit 109, a predictability calculating unit 110, and a prediction frame interval determining unit 111.

The input picture storage unit 101 stores at least input pictures of the number which can be coded with a necessary frame delay and outputs the stored input picture signals in the coding order in accordance with a predicted structure determined by the prediction frame interval determining unit 111. After that, an input picture is preliminarily divided into a plurality of areas and each of the divided areas is subjected to a coding process.

The local-decoded picture storage unit 102 stores a picture obtained by decoding (locally decoding) an already coded picture. The stored picture data is read as picture data referred to at the time of motion vector search and motion compensated interframe prediction of an input image in accordance with a prediction structure determined by the prediction frame interval determining unit 111.

The motion vector searching unit 103 searches a motion vector from a selected input picture to be coded which is outputted from the input picture storage unit 101 and a selected reference picture from pictures recorded in the local-decoded picture storage unit 102 in accordance with the prediction structure determined by the prediction frame interval determining unit 111. The motion vector searching unit 103 outputs motion vector information used for prediction.

The motion compensation interframe predicting unit 104 performs motion compensated interframe prediction by using the motion vector obtained by the motion vector searching unit 103 and the predicting method by referring to a picture recorded in the local-decoded picture storage unit 102 in accordance with the prediction structure determined by the prediction frame interval determining unit 111 and outputs a motion compensated interframe predicted picture.

The subtractor 105 calculates a difference between the input picture to be coded and the predicted picture signal and outputs a prediction error signal. The prediction error coding unit 106 performs coding on the prediction error signal and outputs coded data. The prediction error decoding unit 107 decodes the prediction error signal from the coded data and outputs the decoded prediction error signal.

The adder 108 adds the decoded prediction error signal and the motion compensated interframe prediction signal and outputs a local-decoded picture signal. The local-decoded picture signal is recorded in the local-decoded picture storage unit 102.

The bit stream converting unit 109 converts the motion vector in each of the divided area obtained in the motion vector searching unit 103 and the data coded by the prediction error coding unit 106 into a bit stream and outputs the bit stream. The bit stream converting unit 109 calculates the quantity of generated codes every coded frame.

The predictability calculating unit 110 calculates predictability of each frame from the result of the calculation of the quantity of codes of each frame.

The prediction frame interval determining unit 111 determines an interval between frames of a picture to be subjected to forward prediction on the basis of the predictability of each frame calculated by the predictability calculating unit 110, changes the M value from a coding position which can be switched as shown in FIGS. 10, 11 and 12, and designates the coding order and the picture type of an input picture and a reference picture.

Figure 2:
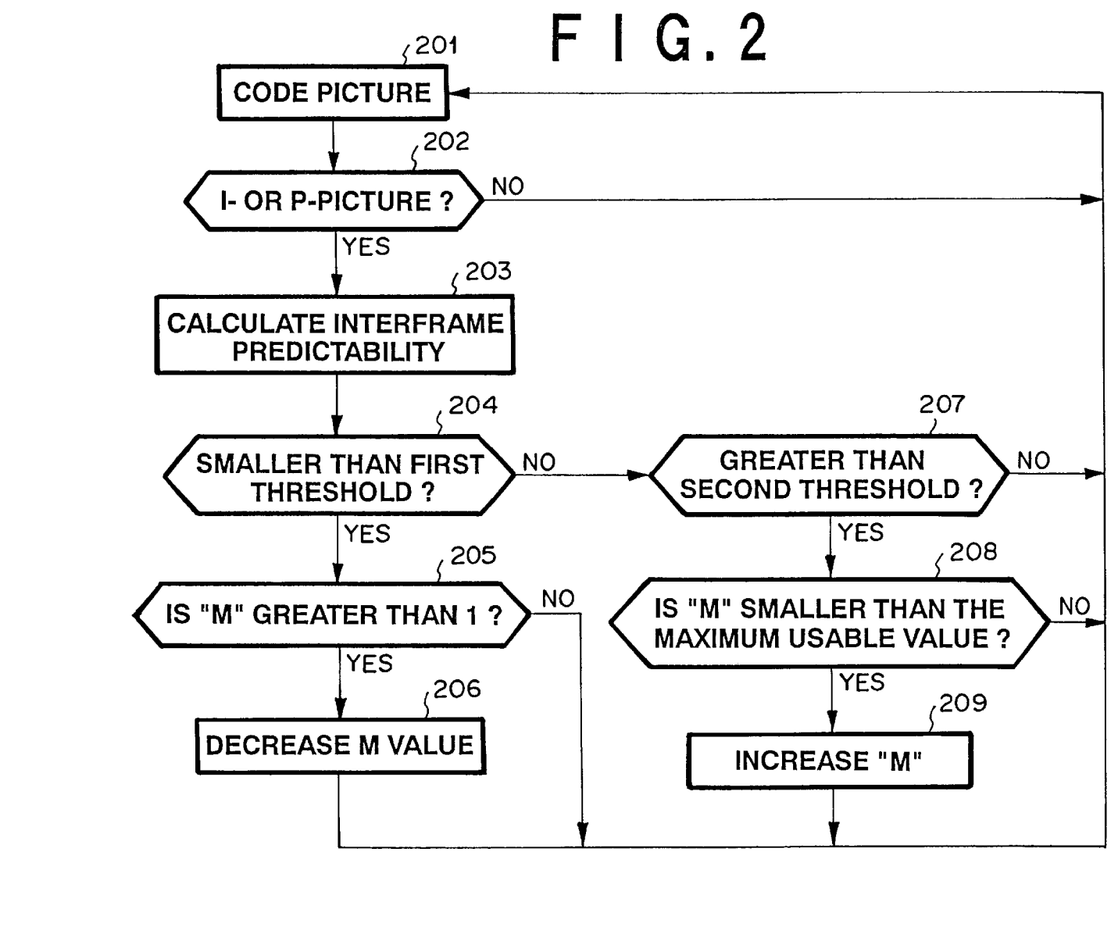
FIG. 2 is a flowchart for explaining the operations of the embodiment of the moving picture coding apparatus of the invention.

FIG. 2 is a flowchart for explaining the operations of the apparatus of the invention and shows the procedure of coding a picture.

First, a picture in each frame is coded according to the prediction frame interval and the coding picture type determined by the prediction frame interval determining unit 111 (Step 201).

After completion of the process of coding the picture, in Step 202, when the picture is neither an I-picture (I frame) nor a P-picture (P frame), the routine directly advances to the following picture coding process. When the picture is either an I-picture (I frame) or a P-picture (P frame), the routine advances to Step 203 where predictability of the picture is calculated.

In Step 204, whether the interframe predictability calculated in Step 203 is smaller than the first threshold or not is determined. When the calculated interframe predictability is smaller than the first threshold, the routine advances to Step 205. If not, the routine advances to Step 207. In Step 205, whether the M value is larger than 1 or not is determined. When the M value is larger than 1, the M value is decreased in Step 206. When the M value is equal to or smaller than 1, the M value is maintained.

In Step 207, whether the calculated interframe predictability is larger than a second threshold or not is determined. When the calculated interframe predictability is equal to or smaller than the second threshold, the routine advances to the next picture coding process. When the calculated interframe predictability is larger than the second threshold, the routine advances to Step 208.

In Step 208, whether the M value is smaller than the maximum M value which can be dealt by the coding apparatus or not is determined. When the M value is smaller than the maximum M value which can be dealt by the coding apparatus, the M value is increased in Step 209. If not, the routine advances to the next picture coding process.

With respect to the updating timing of the M value, as shown in FIGS. 10, 11 and 12, the next I- or P-picture (P frame) in the coding order is coded with the updated M value.

In the case of adopting the control of varying the M value, the I-picture (I frame) is coded in place of the P picture at an arbitrary frame position. For example, when the interval of frames of I pictures exceeds a predetermined number, irrespective of the above logic, it is sufficient to forcedly code the frame at that time as an I picture.

Although coding is generally performed so that the frame interval N of an I picture is a predetermined value, depending on a combination of changes in M values, pictures coded as either I pictures or P-pictures (P frames) do not always appear at fixed intervals. In some cases, the frame interval N of the I pictures varies as a result.

As scales for measuring predictability, the value of a quantity of codes Sp of a frame subjected to interframe forward predictive coding and the value of a quantity of codes Si of a frame subjected to intraframe coding can be used.

Alternatively, the value of coding complexity Xp of a frame subjected to interframe forward predictive coding and the value of coding complexity Xi of a frame subjected to the intraframe coding may be used. The coding complexity is defined in relation to a quantization scale used when an intraframe signal or an interframe prediction error is quantized. That is, it is defined by the product (MQS). (S) of a mean value (MQS) per frame of a quantization scale used for coding an intraframe signal or interframe prediction error of the frame and the quantity of codes (S) of the frame. That is, the coding complexity can be regarded as a value of estimating the quantity of codes when it is assumed that the same quantization scale is used for all the frames. The quantization scale varies largely according to the contents of a picture. The quantity of codes varies largely according to the quantization scale. By using the coding complexity as the scale for measuring the predictability, the M value can be calculated more properly. Since the coding complexity is calculated by using only the quantity of codes and the quantization scale as information which is inevitably generated at the time of coding each picture, in the operation itself of coding each picture, it is unnecessary to calculate information which is not always necessary such as the activity in the second conventional method. This produces effects such as suppression of increase in the scale of hardware and suppression of deterioration of the processing capability of a processor when the coding apparatus is realized by software.

Usually, as the predictability, the interframe prediction error amount is used to measure the accuracy of prediction. Even when the amount of a prediction error is the same, the degree of detecting an error varies according to complexity of a picture pattern. The complexity of a picture pattern is reflected in the quantity of codes of an intraframe coded frame (that is, the quantity of codes of an I-picture (I frame)) and the coding complexity. The interframe prediction error amount is reflected in the quantity of codes of an interframe predictive coded frame and the coding complexity. Consequently, by using the quantity of codes of each picture type and the coding complexity, the scale for measuring the predictability in which the complexity of a picture pattern is considered can be obtained.

The predictability may be defined, on the basis of the fact that the more the picture pattern is complicated, the more it is difficult to detect the prediction error. The predictability may be a function which decreases with increasing quantity of codes of P frame or complexity of picture and a function which increases with decreasing quantity of codes of P frame or complexity of picture. The predictability may also be a function which increases with increasing quantity of codes of I frame or complexity of picture and a function which decreases with decreasing quantity of codes of I frame or complexity of picture.

Figure 3:
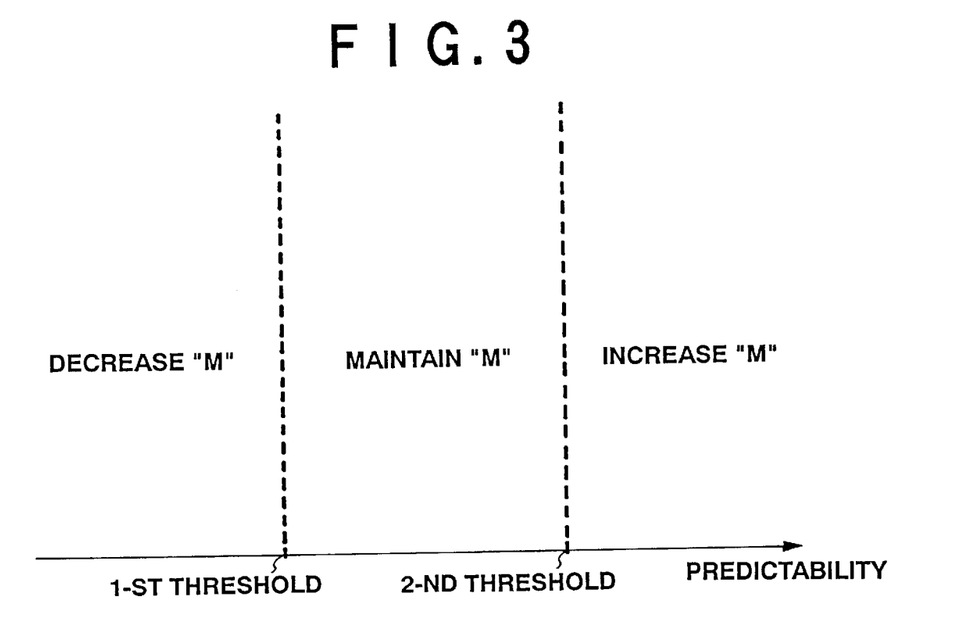
FIG. 3 is a diagram for explaining setting of thresholds used in the moving picture coding apparatus of the invention.

Referring to FIG. 3, the method of setting a threshold in the invention will be explained. As shown in FIG. 3, according to the invention, when the predictability is low and coding noise is conspicuous, the prediction frame interval is reduced to improve the predictability. On the contrary, when the predictability is sufficiently high, the prediction frame interval is widened to increase the coding efficiency. By updating the M value by such a threshold setting process, it is controlled so that a moving picture is coded with an optimum M value.

Figure 4:
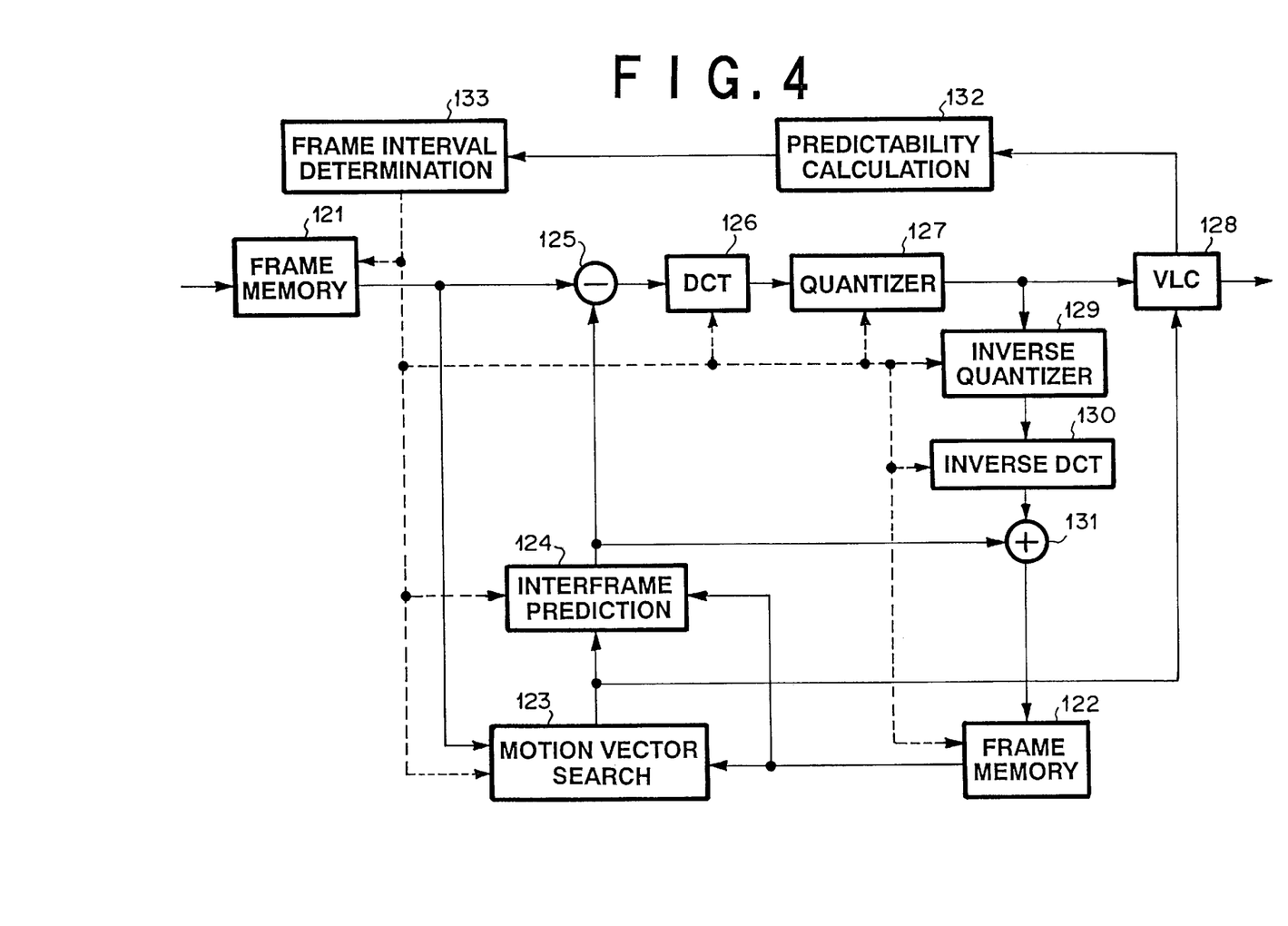
FIG. 4 is a block diagram for explaining the embodiment of the moving picture coding apparatus of the invention.

FIG. 4 shows the second embodiment of the invention. The second embodiment of the invention is a case of coding a moving picture according to the MPEG-2 (ISO-13818-2) standard In FIG. 4, a moving picture coding system of the embodiment comprises a frame memory 121 for input pictures, a frame memory 122 for local-decoded pictures, a motion vector searching unit 123, a motion compensation interframe predicting unit 124, a subtractor 125, a discrete cosine transform (DCT) unit 126, a quantizer 127, a variable-length coding (VLC) unit 128, an inverse quantizer 129, an inverse DCT unit 130, an adder 131, a predictability calculating unit 132, and a prediction frame interval determining unit 133.

The frame memory 121 for input pictures stores at least input pictures of the number which can be coded with a necessary frame delay and outputs a stored input picture signal in the coding order in accordance with a prediction structure determined by the prediction frame interval determining unit 133. After that, an input picture is divided into macro blocks each consisting of 16 pixels×16 lines and a coding process is performed every macro block.

The frame memory 122 for local-decoded pictures stores a local-decoded picture obtained by locally decoding an already coded picture and outputs a local-decoded picture signal which is necessary for motion vector search and motion compensated interframe prediction of an input picture in accordance with a prediction structure determined by the prediction frame interval determining unit 133.

The motion vector searching unit 123 searches a motion vector of a selected picture to be subjected to interframe predictive coding which is outputted from the frame memory 121 for input pictures and a selected reference picture recorded in the frame memory 122 for local-decoded pictures in accordance with the prediction structure determined by the prediction frame interval determining unit 133. The motion vector searching unit 123 detects the motion vector of each of the divided areas and outputs motion vector information used for prediction.

The motion compensation interframe predicting unit 124 performs motion compensated interframe prediction from the motion vector obtained by the motion vector searching unit 123 and the predicting method by referring to a picture recorded in the frame memory 122 for local-decoded pictures in accordance with the prediction structure determined by the prediction structure determining unit 132 and outputs a motion compensated interframe predicted picture. In a picture or macroblock to be subjected to intraframe coding, a fixed value 0 is outputted as the motion compensated interframe prediction signal.

The subtractor 125 calculates a difference between the input picture to be coded and the motion compensated interframe predicted image signal and outputs a prediction error signal. Since the fixed value 0 is supplied to the subtractor 125 as the motion compensated interframe prediction signal in a picture or macroblock to be subjected to intraframe coding, the same signal as that of the frame memory 121 is outputted from the subtractor 125.

The DCT unit 126 performs DCT on the prediction error signal and outputs DCT coefficients. The quantizer 127 quantizes the DCT coefficients and outputs the quantized DCT coefficients. A quantization step is used for quantization and is adjusted by a controller (not shown) in order to attain a desired quantity of codes.

The VLC (variable length coding) unit 128 performs variable-length coding on the motion vector and the predicting method of each divided area obtained by the motion vector searching unit 123 and the coded data quantized by the quantizing unit 127 into a bit stream, and outputs the bit stream as coded data. The VLC unit 128 calculates the amount of codes generated every coded frame.

The inverse quantizer 129 inversely quantizes the quantized DCT coefficients and outputs decoded DCT coefficients. The inverse DCT unit 130 performs inverse DCT on the decoded DCT coefficients and outputs a decoded prediction error signal.

The adder 131 adds the decoded prediction error signal and the motion compensated interframe prediction signal and outputs a local-decoded picture signal. The local-decoded picture signal is stored in the local-decoded picture storage unit 122.

The predictability calculating unit 132 calculates the predictability of each frame from the result of coding of each frame.

The prediction frame interval determining unit 133 determines an interval between frames of a picture to be subjected to forward prediction on the basis of the predictability of each frame calculated by the predictability calculating unit 132, changes the M value from a coding position at which the M value can be switched as shown in FIGS. 10, 11 and 12, and designates the coding order and the picture type of an input picture and a reference picture.

Figure 5:
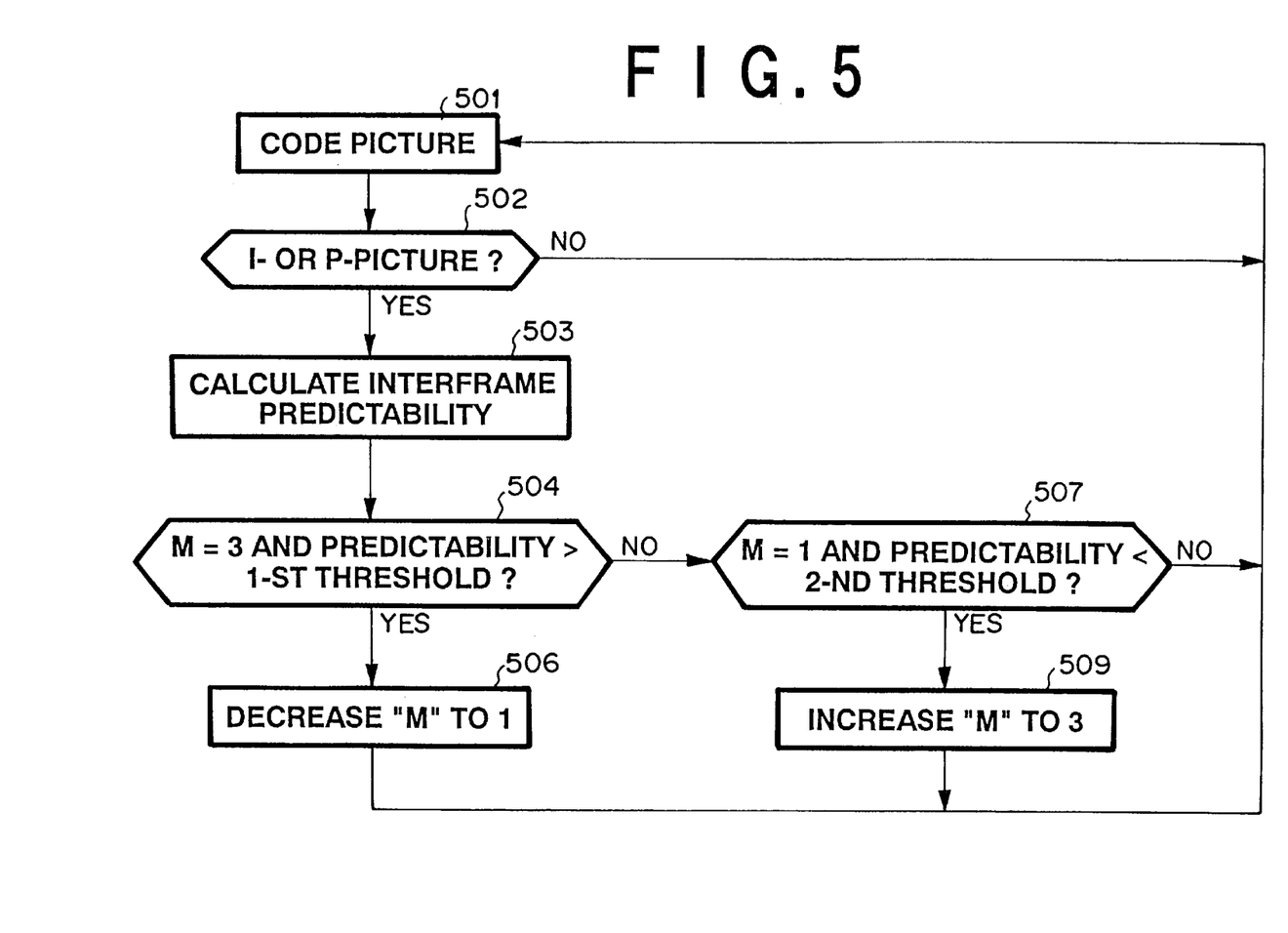
FIG. 5 is a flowchart for explaining operations of the embodiment of the moving picture coding apparatus of the invention.

A case of switching the M value between 3 and 1 will be described here. FIG. 5 is a flowchart for explaining the operations in the second embodiment of the invention and shows the procedure of coding a picture.

First, in Step 501, a picture in each frame is coded according to the prediction frame interval and the coding picture type determined by the prediction frame interval determining unit 133.

After completion of the process of coding the picture, in Step 502, the picture type is determined. When the picture is neither an I-picture (I frame) nor a P-picture (P frame), the routine directly advances to the following picture coding process. When the picture is either an I-picture (I frame) or a P-picture (P frame), the predictability of the picture is calculated in Step 503.

Subsequently, processes in Steps 504, 506, 507 and 509 are executed. When the M value is 3 and the calculated interframe predictability is smaller than a first threshold, the M value is decreased to 1. If NO, the M value is maintained and the coding is continuously performed with the M value of 3. On the contrary, when the M value is 1 and the calculated interframe predictability is larger than a second threshold, the M value is increased to 3. If NO, the M value is maintained at 1 and the coding is continuously performed.

With respect to the updating timing of the M value, as shown in FIG. 12, the next I- or P-picture (P frame) in the coding order is coded with the updated M value.

Figure 6A:
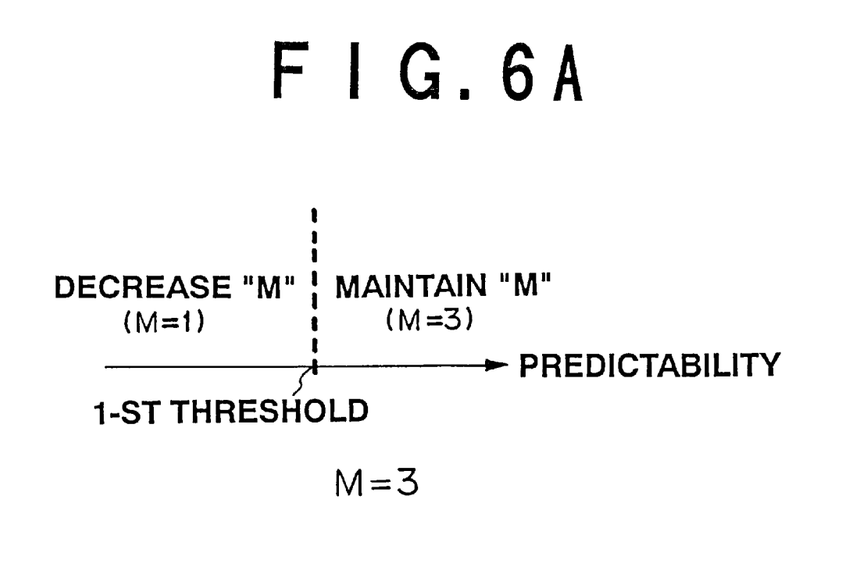
FIG. 6A is a diagram for explaining setting of thresholds used in the moving picture coding apparatus of the invention.
Figure 6B:
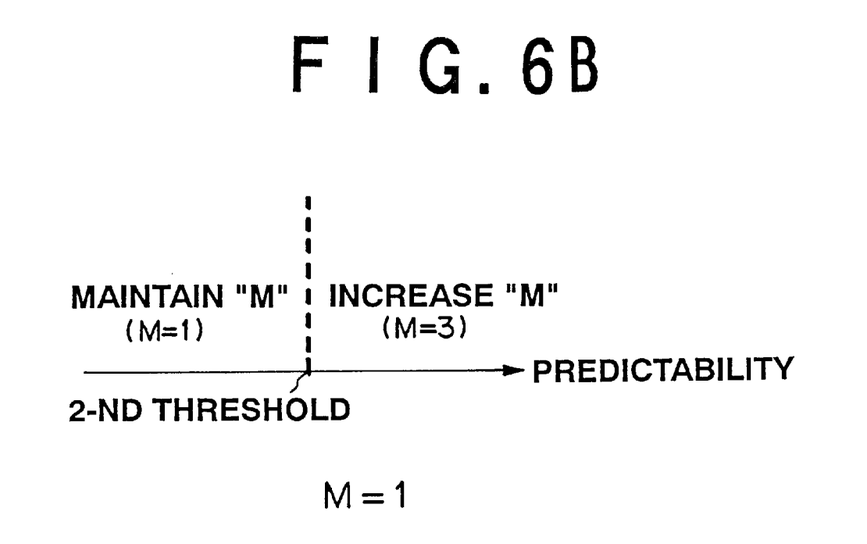
FIG. 6B is a diagram for explaining setting of thresholds used in the moving picture coding apparatus of the invention.

FIGS. 6A and 6B show setting of a threshold in the second embodiment. First, in the case where coding is performed with the M value of 3, as shown in FIG. 6A, by comparing the calculated predictability with the first threshold, whether the M value is set to 1 or 3 is determined. In the case where coding is performed with the M value of 1, as shown in FIG. 6B, by comparing the calculated predictability with the second threshold, whether the M value is set to 3 or 1 is determined. Since the value of the predictability varies according to the coded M value, a plurality of pairs each of the first and second thresholds are preset in accordance with the M value used for coding.

When it is assumed that the quantity of codes of an interframe forward predictive coded frame is Sp and the quantity of codes of an intraframe coded frame is Si, the value "Pred" of predictability can be calculated as a linear sum or ratio of Sp and Si as shown by the following equations (1) and (2).

$$Pred = Si - a \times Sp \quad (1)$$

$$Pred = Si/Sp \quad (2)$$

Alternatively, when it is assumed that coding complexity of an interframe forward predictive coded frame is Xp and coding complexity of an intraframe coded frame is Xi, the value "Pred" of predictability can be calculated as a linear sum or ratio of Xp and Xi as follows.

$$Pred = Xi - b \times Xp \quad (3)$$

$$Pred = Xi/Xp \quad (4)$$

where "a" and "b" are constants.

As further another embodiment, when the M value is larger than 1 and a B picture is used, coding information of the B picture may be used. For example, when there is a change in scene, a flash picture or the like, the predictability instantaneously deteriorates in a P-picture and, in some cases, the M value changes to a value which is not always proper. In order to solve the problem, it is preferable to use the predictability of the B-picture as well. The procedure in this case is shown by the flowchart of FIG. 7.

Figure 7:
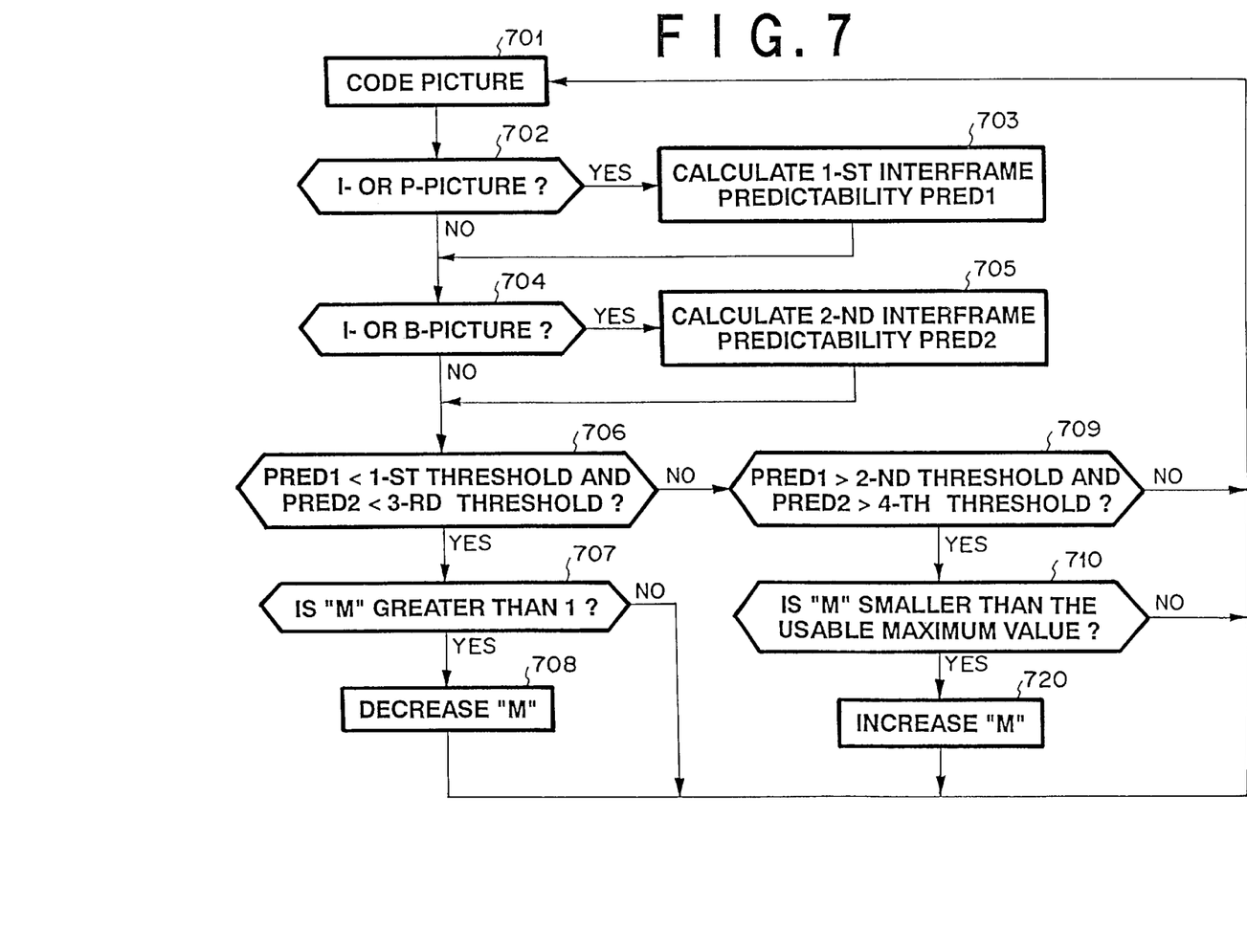
FIG. 7 is a flowchart for explaining the operations of another embodiment of the moving picture coding apparatus of the invention.

FIG. 7 shows the procedure of coding a picture.

First, a picture of each frame is coded in accordance with the prediction frame interval and the coding picture type determined by the prediction frame interval determining unit 111 (Step 701).

After completion of the coding process of the picture in Step 701, the routine advances to Step 702. When it is determined in Step 702 that the picture is either an I- or P-picture, first predictability (Pred1) of the picture is calculated in Step 703. If not, the first predictability (Pred1) is not calculated.

When it is determined in Step 704 that the picture is either an I- or B-picture, second predictability (Pred2) of the picture is calculated. If not, the second predictability (Pred2) is not calculated in Step 705. The first predictability denotes predictability of a frame to be subjected to interframe forward prediction and the second predictability denotes predictability of a frame to be subjected to interframe bidirectional prediction.

When it is determined in Step 706 that the first interframe predictability calculated is smaller than the first threshold and the second interframe predictability calculated is smaller than a third threshold, whether the M value is larger than 1 or not is determined in Step 707. When the M value is larger than 1, the M value is decreased in Step 708.

On the contrary, when the determination conditions are not satisfied in Step 706, the routine advances to Step 709 where whether or not the first interframe predictability calculated is larger than the second threshold and the second interframe predictability is larger than a fourth threshold is determined. If YES, the routine advances to Step 710 where whether or not the M value is smaller than the maximum M value-which can be dealt by the coding apparatus is determined. If YES, the routine advances to Step 720 where the M value is increased.

At the updating timing of the M value, as shown in FIGS. 10, 11 and 12, the next I- or P-picture in the coding order is coded with the updated M value. Since no B picture is used when the coding is performed with the M value of 1, determination is made only by the first interframe predictability without using the second interframe predictability.

Figure 8:
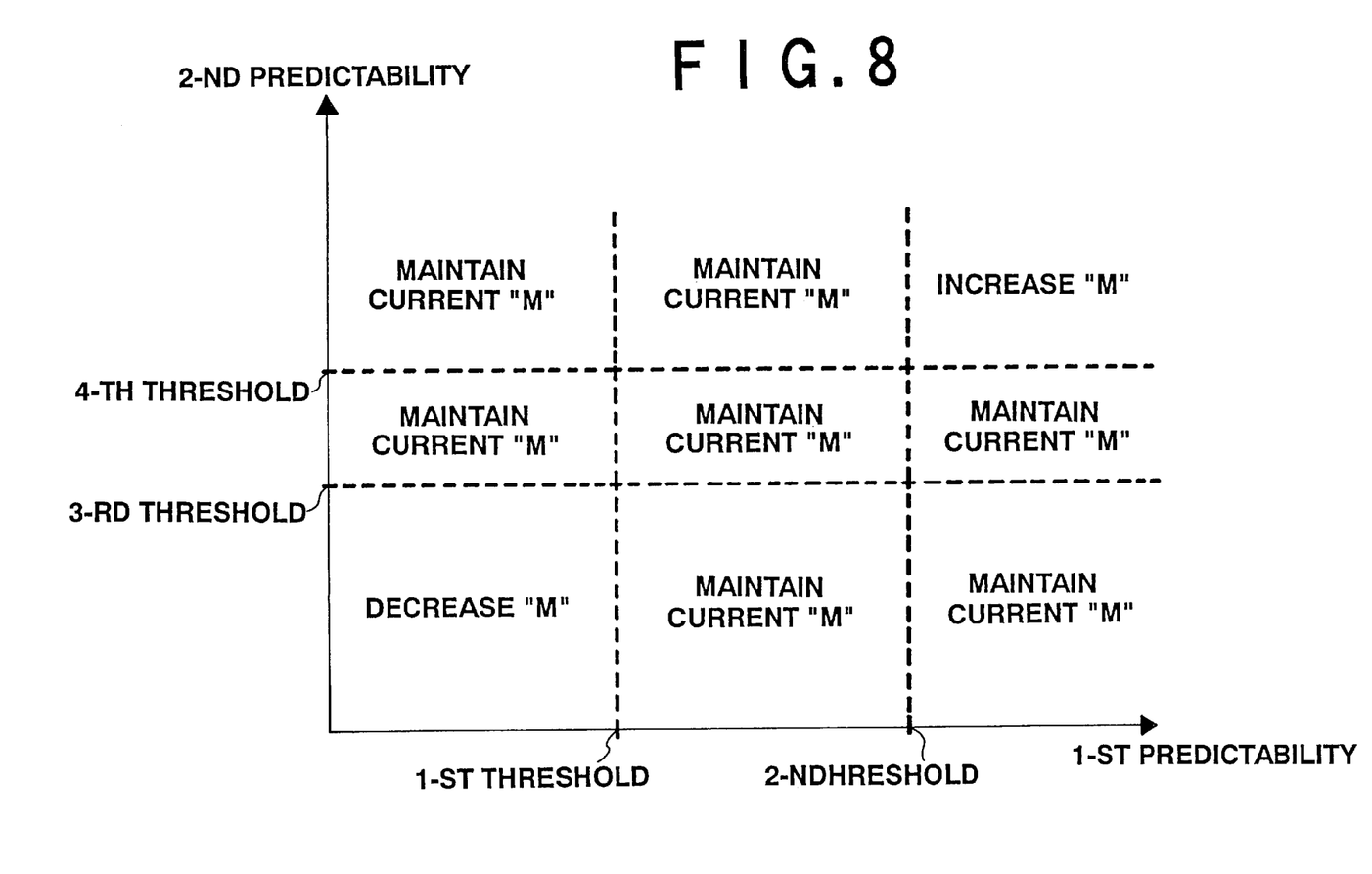
FIG. 8 is a diagram for explaining setting of thresholds used in the another embodiment of the moving picture coding apparatus of the invention.

FIG. 8 shows setting of a threshold in the embodiment. As shown in FIG. 8, in the embodiment, when both the first and second predictability is low, the prediction frame interval is narrowed. On the contrary, when both the first and second predictability is high, the prediction frame interval is widened to increase the coding efficiency. The method of increasing or decreasing the M value is not limited to the method by classification using four thresholds shown in FIG. 8 but a method of using spaces indicated by two predictability values in arbitrary area shapes may be also used.

As shown in the above equations (1) to (4), the scale of the first predictability can be calculated from the value of a quantity of codes Sp of an interframe forward predictive coded frame and the value of a quantity of codes Si of an intraframe coded frame. Alternatively, it can be calculated from the value of coding complexity Xp of an interframe forward predictive coded frame and coding complexity Xi of an intraframe coded frame.

Similarly, the scale "Pred2" of the second predictability can be also calculated from the quantity of codes Sb of an interframe bidirectional predictive coded frame and the quantity of codes Si of an intraframe coded frame or from coding complexity Xb of an interframe bidirectional predictive coded frame and coding complexity Xi of an intraframe coded frame as follows.

$$Pred2=Si-c \times Sb \quad (5)$$

$$Pred2=Si/Sb \quad (6)$$

$$Pred2=Xi-d \times Xb \quad (7)$$

$$Pred2=Xi/Xb \quad (8)$$

where, "c" and "d" are constants.

As further another embodiment, in place of a method of increasing or decreasing the M value by the process using the threshold with respect to the predictability scale "Pred", the M value may be directly calculated from the value of the predictability scale "Pred" by, for example, the following equation 9.

$$M=A+B \times Pred \quad (9)$$

where "A" and "B" are constants.

When the right side of the equation (9) does not become a natural number as the result of calculation, a natural number closest to the calculated value is used as a new M value.

The method of calculating the M value is not limited to the above. As long as an M value increases as the predictability scale "Pred" becomes larger and the M value decreases as the predictability scale "Pred" becomes smaller, another equation may be used.

Obviously, in place of the direct calculation using the calculation expression, the M value may be obtained from a table by using the Pred value.

A method including the second predictability scale "Pred2" may be also used.

What is claimed is:

1. An apparatus for a one-pass moving picture coding which compensates an interframe motion, by using intraframe (I frame), interframe forward prediction frame (P frame), and interframe bi-directional prediction (B frame), which comprises:
   a calculation unit for calculating a predictability of a P frame which has been encoded just before; and
   a determination unit for determining a frame interval between P frames one of which is going to be encoded,
   wherein said frame interval is adaptively changes on the basis of said predictability.

2. The apparatus for coding a moving picture according to claim 1, wherein said predictability is calculated on the basis of a quantity of codes in said I frame and a quantity of codes in said P frame.

3. The apparatus for coding a moving picture according to claim 2, wherein said predictability is a linear combination of said quantity of codes in said I frame and said quantity of codes in said P frame.

4. The apparatus for coding a moving picture according to claim 2, wherein said predictability is a ratio Z/W, where W is said quantity of codes in said P frame, and Z is said quantity of codes in said I frame.

5. The apparatus for coding a moving picture according to claim 2, wherein said predictability is calculated on the basis of a quantity of codes in said I frame, a quantity of codes in said P frame and a quantity of codes in said B frame.

6. The apparatus for coding a moving picture according to claim 1, which further comprises a quantization unit for quantizing a frame, and for calculating a complexity of the quantized frame which is defined by a product of a quantity of codes in said quantized frame and an average quantization scales in said quantized frame,
   wherein said predictability is calculated on the basis of said complexity of said I frame and said complexity of said P frame.

7. The apparatus for coding a moving picture according to claim 6, wherein said predictability is a linear combination of said complexity of said I frame and said complexity of said P frame.

8. The apparatus for coding a moving picture according to claim 6, wherein said predictability is a ratio V/U, where U is said complexity of said P frame, and V is said complexity of said I frame.

9. The apparatus for coding a moving picture according to claim 6, wherein said predictability is calculated on the basis of said complexity of said I frame, said complexity of said P frame and said complexity of said B frame.

10. The apparatus for coding a moving picture according to claim 1, wherein said decision unit make said frame interval short, when said predictability is smaller than a prescribed threshold.

11. The apparatus for coding a moving picture according to claim 1, wherein said decision unit make said frame interval long, when said predictability is greater than a prescribed threshold.

12. The apparatus for coding a moving picture according to claim 1, wherein said decision unit decides said frame interval on the basis of prescribed frame intervals which are prescribed for possible values of said predictability.

13. An method for a one-pass moving picture coding which compensates an interframe motion, by using intraframe (I frame), interframe forward prediction frame (P frame) and interframe bi-directional prediction (B frame), which comprises the steps of:
    calculating a predictability of a P frame which has been encoded just before;
    determining a frame interval between P frames one of which is going to be encoded, and
    changing adaptively said frame interval on the basis of said predictability.

* * * * *